United States Patent

Ohayon

[15] 3,665,566

[45] May 30, 1972

[54] APPARATUS FOR THE MANUFACTURE OF TEXTURIZED THREADS

[72] Inventor: Gabriel Ohayon, Lyon, France

[73] Assignee: Societe Rhodiaceta

[22] Filed: Feb. 12, 1970

[21] Appl. No.: 10,858

[30] Foreign Application Priority Data

Feb. 12, 1969  France..................................6903310

[52] U.S. Cl..............................................................28/1.4
[51] Int. Cl.........................................................D02g 1/16
[58] Field of Search...............................28/1.4, 72.12; 57/34

[56] References Cited

UNITED STATES PATENTS

| 2,220,024 | 10/1940 | Pool......................................57/34 B X |
| 3,026,597 | 3/1962 | Swaney.......................................28/1.4 |
| 3,110,151 | 11/1963 | Bunting et al..........................28/1.4 X |
| 3,237,269 | 3/1966 | Hawkins....................................28/1.4 |
| 3,333,313 | 8/1967 | Gilmore et al............................28/1.4 |
| 3,388,442 | 6/1968 | Shumaker..................................28/1.4 |
| 3,396,442 | 8/1968 | Gilmore....................................28/1.4 |

Primary Examiner—Louis K. Rimrodt
Attorney—Sherman & Shalloway

[57] ABSTRACT

An apparatus for the continuous high speed manufacture of texturized thermoplastic threads employing a fluid which apparatus comprises two assembled blocks of simple geometric form which blocks have therein two conduits in communication with each other. The first of the conduits is constituted by a longitudinal groove extending throughout the entire length of one side of one of the blocks and the second conduit constitutes a groove completely within one side of the other block so that when the blocks are assembled with the conduits facing each other the conduit in the second block is disposed at an angle to the first conduit.

5 Claims, 5 Drawing Figures

PATENTED MAY 30 1972

INVENTOR
GABRIEL OHAYON

BY Sherman & Shalloway

ATTORNEYS

INVENTOR
GABRIEL OHAYON

BY Sherman & Shalloway

ATTORNEYS

APPARATUS FOR THE MANUFACTURE OF TEXTURIZED THREADS

The instant invention is directed to an apparatus for use in the high speed manufacture of texturized threads which apparatus employs a fluid to impart a twist to the threads. In particular, the instant invention is directed to an apparatus for imparting a texture to thermoplastic threads which apparatus includes at least two adjacent blocks one of which blocks has a groove which serves as a conduit for the thread while the other block contains a conduit for the passage of fluid, which conduits are so constructed that when the blocks are placed in communication with each other the fluid conduit contacts the thread conduit from a different direction and preferably at a 90 degree angle.

As noted, the instant invention is directed to an apparatus for the high speed continuous manufacture of texturized threads and, in particular, to an apparatus for use in the manufacture of threads having a torque effect by a technique which employs a fluid. In the past, it has been known to produce twisted threads pneumatically by false twisting techniques. Such a technique is disclosed in French Pat. No. 791,906 wherein threads still in a plastic state are exposed to the action of an agitated gaseous fluid so as to create a twist therein. Such a device, however, is not amenable to use in a high speed texturization process and further is not adapted for use in connection with synthetic materials.

It is further noted that diverse texturization apparatuses have been described for use in connection with thermoplastic materials in addition to synthetic and/or artificial threads. Such devices have, in general, been constructed so that the thread employed in the process is submitted to the tangential action of a treating fluid, one of such devices is disclosed in U. S. Pat. No. 3,353,344. The device disclosed therein is said to consist of a block in two parts one of which parts contains a cylindrical cavity which serves as a turbulence chamber through which the thread is passed and the other of which blocks has a conduit which serves to bring the fluid material in an approximately tangential manner to the turbulent chamber. Furthermore, the device is disclosed to have a string-up slot which intercepts the yarn passageway or turbulence chamber, which slot runs the length of the block containing the chamber. An essential feature of this apparatus is said to be the particular location of the fluid conduit. That is to say, the fluid conduit is positioned to intercept the string-up slot at an angle of about 15 to 90 degrees and in a location in proximity to the yarn passageway. Such devices while of a relatively simple form are not well suited to high speed operations in the preparation of texturized thermoplastic yarns inasmuch as the thread while contacted with a fluid in a tangential manner is also contacted with the fluid radially which leads to numerous disadvantages in the manufacturing process. Furthermore, while the apparatus disclosed in the U.S. Patent is of relatively simple construction, said apparatus is difficult to prepare inasmuch as the interior of the block must be manufactured so as to contain cylindrical cavities throughout. Such manufacture is not only difficult but also expensive. Furthermore, such apparatus are difficult to reproduce in an exacting manner in light of the location of the conduits contained therein.

There have been other techniques devised for the manufacture of texturized threads but they are generally concerned with mechanical processes involving moving parts which are both inconvenient and expensive. Furthermore, such mechanical processes are not particularly well suited for high speed manufacturing techniques.

It is desirable to manufacture such threads inasmuch as they are particularly well suited for use in the manufacture of stockings, and, further in a great number of manufactured articles.

Therefore, it is an object of the instant invention to overcome the above-noted disadvantages previously associated with the manufacture of texturized threads.

Another object of the instant invention is to provide an apparatus which is particularly suited for the high speed manufacture of texturized threads.

Another object of the instant invention is to provide an apparatus which is easily and economically reproduced and, therefore, well suited for mass production.

Yet another object of the instant invention is to provide an apparatus which is comprised of at least two adjacent blocks one of which blocks contains on the surface thereof a groove which serves as a conduit for the passage of thread and the other of which blocks contains a groove which serves for the passage of fluid which blocks when placed in contact with each other are so designed that the grooves are in communication with each other at a 90 degree angle.

These and other objects of the instant invention will become more evident from the following more detailed description thereof.

As previously noted, the instant invention is directed to a novel texturization apparatus particularly well suited for use in the high speed manufacture of texturized thermoplastic yarn. The instant generally characterized in apparatus including at least two blocks which may be of any simple geometric form including, for example, parallelogram, half cylinder, cylinder and the like. Each of the blocks is designed such that it contains a conduit which conduits, when the blocks are placed together with each other, are in communication with each other. One of the conduits is designed for the passage of threads while the other of the conduits is designed to carry the fluid employed in the texturization process. The apparatus is particularly characterized in that the conduit employed for the passage of thread is formed by a longitudinal groove running the entire length of one side of one of the blocks. Furthermore, the conduit which is designed to carry the fluid material is located on that side of the second block which is placed in communication with the yarn conduit of the first block. When constructed, each of the blocks is disposed in such a relation with the other block that the fluid carrying conduit passes in a direction different from that of the yarn carrying conduit and is located in communication therewith.

The subject blocks which comprise the instant apparatus may be maintained in communication with each other by any one of several techniques. That is to say, the blocks may be maintained in communication by clamps, plugs, screws, or any other conventional assembling technique so that when constructed they comprise a tight, solid assembly as a result of the clamping means. Such a technique is designed so that all possibility of yarn slippage through the assembly surfaces is avoided. That is to say the clamping means must be of such a nature that the two surfaces of the blocks are in complete contact with each other so as to avoid all escape of either the fluid and/or thread which might create difficulties during the high speed manufacturing process.

According to a preferred embodiment of the instant invention the exact position of the individual conduits and blocks with relation to each other can be varied according to the particular use to which the blocks are put.

A further aspect of the preferred embodiment is that the conduit which serves as a thread passage is constituted by a longitudinal groove having a U-shape, the two sides of which are approximately perpendicular to the plane of the block and are joined by a line approximately in the form of the arc of a circle. The groove constituting the fluid conduit is approximately perpendicular to the longitudinal groove of the U-shaped thread conduit with the end of the fluid conduit serving as a point of communication with the thread conduit. It is to be noted that it is important to the apparatus of the instant invention that the end of the fluid conduit does not extend beyond the thread conduit. The cross-section of the fluid conduit may be of an identical or different shape from that of the thread conduit and, furthermore, the dimensions of the fluid conduit may either be smaller than or greater than that of the thread conduit. It is to be noted, however, that preferably the fluid conduit has dimensions either greater than or equal to those of the cross-section of the thread conduit.

A further critical aspect of the apparatus of the instant invention is that the end of the fluid conduit be in contact with the thread conduit since it is the end of the fluid conduit which determines the action of the fluid on the thread and, therefore, the shape thereof is important to the instant apparatus. The end of the fluid conduit should contain no sharp angles, and, preferably a rounded form is employed. In this connection, it is noted that the specific dimensions of the end of the fluid conduit are of such a nature that they specifically effect the ultimate product. Therefore, the dimensions may be conditioned to the exact type of thermoplastic thread, the speed at which the apparatus is to be employed, and further the specific conditions under which the texturization is to take place.

Yet a further embodiment of the instant invention includes a regulating means which is employed so as to control the fluid flow through the fluid conduit. Such an apparatus may comprise a needle valve or other similar device which will allow one to slightly alter either the longitudinal and/or transverse displacement of the fluid employed. The instant invention will now be discussed in light of the attached drawings. It is to be noted, however, that the figures are merely exemplary of the apparatus of the instant invention and the instant invention is not, in fact, deemed as being limited thereto.

FIG. 1 of the drawings is a diagrammatic view of the texturizing apparatus of the instant invention incorporated into a texturization process.

Figure 1:
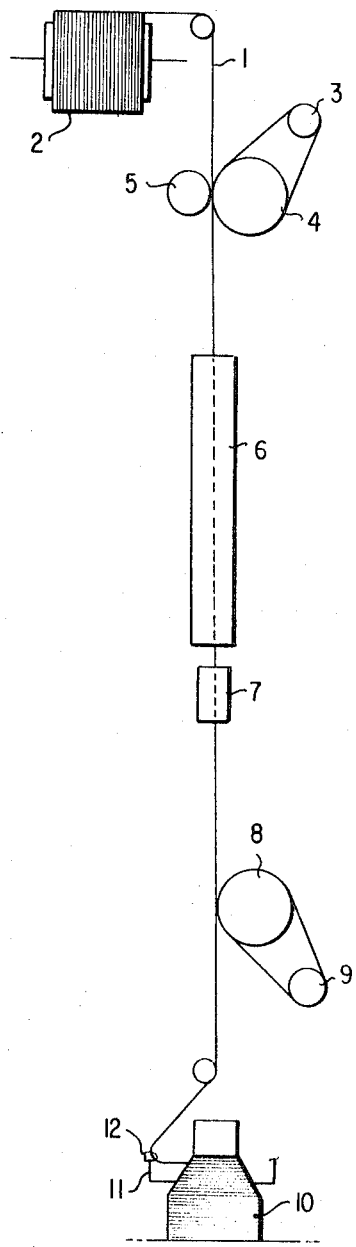

FIG. 1, as noted, is a schematic view of the apparatus of the instant invention embodied in a texturization process. In this particular embodiment a thread 1 passes from a bobbin 2 by means of delivery rollers 3 and 4 and a pressure roller 5 which bears on roller 4 to a heating plate 6 which is maintained at a temperature such that it brings the thermoplastic thread to an approximately plastic state at the moment that it enters the texturization apparatus 7 of the instant invention. Subsequent to treatment in the texturizing apparatus 7 the thread is passed over a system of delivery rollers 8 and 9 to a winding device which may comprise a ring 12, a runner 11 and a receptacle bobbin 10.

Figure 2:
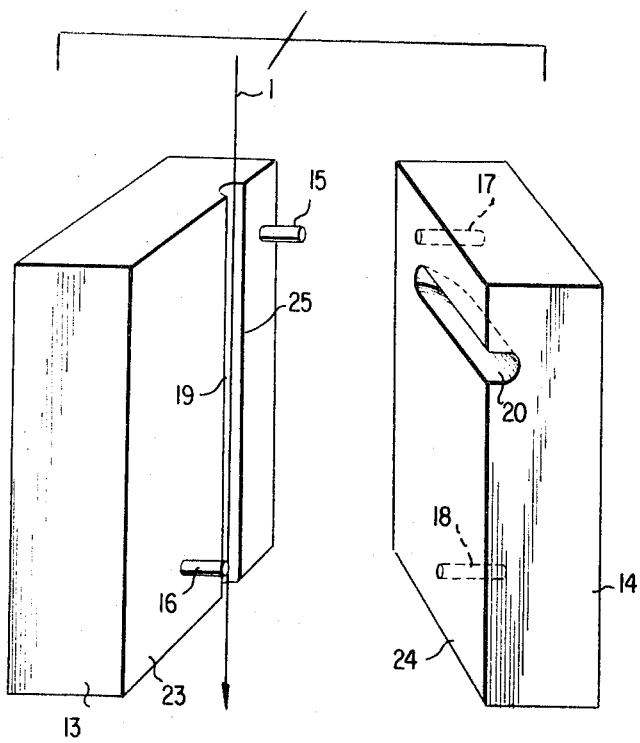
FIG. 2 is a perspective view of the two blocks which constitute the texturizing apparatus of the instant invention.
Figure 3:
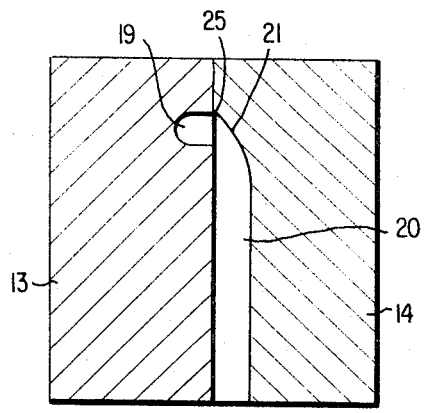
FIG. 3 is a cross-section of a preferred embodiment of the texturizing apparatus of the instant invention.

FIGS. 2 and 3 disclose in more detail the novel texturizing apparatus of the instant invention. The apparatus includes two blocks 13 and 14 which have sides 23 and 24 on approximately the same plane facing each other. The individual blocks are maintained in place by means of bosses 15 and 16 which are placed into cavities 17 and 18. As previously noted, other clamping means may of course be employed to maintain the sides of the blocks in a face to face relationship. The two blocks 13 and 14 have on sides 23 and 24, respectively, two grooves 19 and 20. Groove 19 is located longitudinally in block 13 serves as the thread passage groove. Groove 20 is located on side 24 of block 14 and is arranged in an approximately perpendicular manner to groove 19. Groove 20 serves as the fluid conduit and has an end 21 shaped in a rounded fashion as is shown in more detail in FIG. 3.

Figure 4:
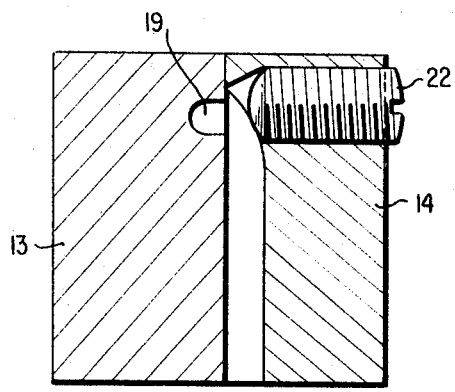
FIG. 4 is a cross-section of a unit according to the instant invention which in addition incorporates a device for regulating the end of the fluid conduit.

According to a preferred form of the instant invention as is illustrated in FIG. 4, the end of the fluid conduit groove 20 may be constructed so as to enable one to control the flow of fluid therethrough preferably by adjustment of a set screw regulator 22.

Figure 5:
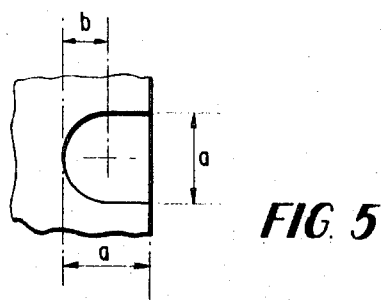
FIG. 5 is a broken view illustrating the thread conduit.

The thread conduit 19 has a U-shape in cross-section, as best illustrated in FIG. 5, with the two sidewalls or branches of the conduit extending perpendicular to side 23 of block 13. In this preferred embodiment the juncture of said the branches is in the form of a half circle reference to FIG. 5 the conduit 19 has the following dimensions:
a. 0.6 mm
b. 0.3 mm The instant invention will now be illustrated by the following description of the apparatus of the instant invention in operation.

A two strand polyamide 66 22 DTEX/2 filaments thread is placed on bobbin 2 of FIG. 1, the thread is passed at a speed of 600 meters per minute through heating plate 6. The heating plate employed had a length of 400 millimeters and was maintained at a temperature of 250° C. The thread was then passed into the texturizing apparatus 7 as represented specifically in FIGS. 2 and 3. The specific apparatus employed was comprised of blocks having a length of 400 millimeters, a width of 8 millimeters and a height of 58 millimeters. The thread carrying longitudinal groove 19 borne by block 13 was constructed as specifically depicted in FIG. 5 as noted above. The fluid conduit groove 20 borne in block 14 was located perpendicular to the thread carrying groove 19. The fluid conduit groove 20 was constructed with a cross-section of a rectangular shape 2 millimeters deep and 0.6 millimeters wide. The end of the fluid conduit 21 was constructed with a rounded form ending at edge 25 of groove 19. The fluid conduit 20 was supplied with air under a pressure of 5.2 kg/cm$^2$ which corresponds to a rate of 0.76 m$^3$/h which corresponds to the volume of air in cubic meters under normal conditions of temperature and pressure.

Subsequent to the treatment in the texturizing apparatus 7 of the instant invention, the thread was wound up on take-up bobbin 10 and allowed to relax 14 percent. As a result of this process, a thread having a torque effect of 1,370 t/m was produced.

The torque effect was ascertained by taking a 1 meter length of thread and attaching it to a fixed point. The thread was then passed through a hook having a weight of 0.132 grams at a second fixed point situated 50 centimeters vertically down from the first fixed point. The thread was then brought back to the first point where the ends thereof were attached. The thread was then freed from the second point by removing the hook and the number of twists of the two strands of thread were measured with a known type of meter. After 12 days the resulting thread had a torque effect of 800 t/m.

According to the instant invention, one may employ numerous different air pressures in association with the fluid conduit such as, for example, 3.5 kg/cm$^2$, which corresponds to a rate of 0.64 m$^3$/h, as a result of which one obtains a thread with a torque effect equal to 686 t/m. It should be noted that the specific air pressure employed is determined by the particulate materials and the degree of twist desired. It is preferred, however, to employ an air pressure of from about 0.5 cubic meters per hour to about 0.9 cubic meters per hour.

As will readily be appreciated, the apparatus of the instant invention is particularly well suited for the high-speed manufacture of texturized threads. Its simple geometric form permits ready manufacture and further eliminates the necessity of piercing into the interior of a block so as to prepare the conduits for either thread passage and/or fluid passage. That is to say, that both conduits, i.e., the thread passage conduit and the fluid passage conduit, are connected to and opened to the surface of the individual blocks thus allowing rapid reproducable manufacture. Furthermore, such manufacture is particularly economical inasmuch, as noted, one does not have to pierce the interior of the block so as to develop further conduits therein.

What is claimed is:

1. An apparatus for the continuous high speed manufacture of texturized thermoplastic thread comprising a first block having a first side surface and a first groove in said first side surface extending entirely across said first block, said first groove being adapted to receive a thread for passage through said first block; and a second block having a second side surface and a second groove in said second side surface terminating at an end within said second block such that said second groove extends only partially across said second block, said second groove being adapted to receive a fluid under pressure, said first and second blocks being assembled with said first and second side surfaces in fluid tight engaging relationship and said end of said second groove aligned with said first groove, said first and second grooves being disposed in angular relation such that only said end of said second groove communicates with said first groove.

2. The apparatus as recited in claim 1 wherein said end of said second groove has a rounded edge aligned with a sidewall of said first conduit whereby fluid is tangentially directed to the thread in said first conduit.

3. The apparatus as recited in claim 2 wherein said first groove is substantially U-shaped in cross-section with the two sidewalls of said groove extending transversely from said first side surface and joined by an arcuate bottom wall.

4. The apparatus as recited in claim 3 wherein said first groove is disposed perpendicularly with respect to said second groove.

5. The apparatus as recited in claim 4 and further comprising adjustment means disposed at said end of said second groove for regulating the flow of fluid therethrough.

* * * * *